I. U. MARLIN.
WELDING TORCH.
APPLICATION FILED MAY 15, 1914.
1,228,038.
Patented May 29, 1917.
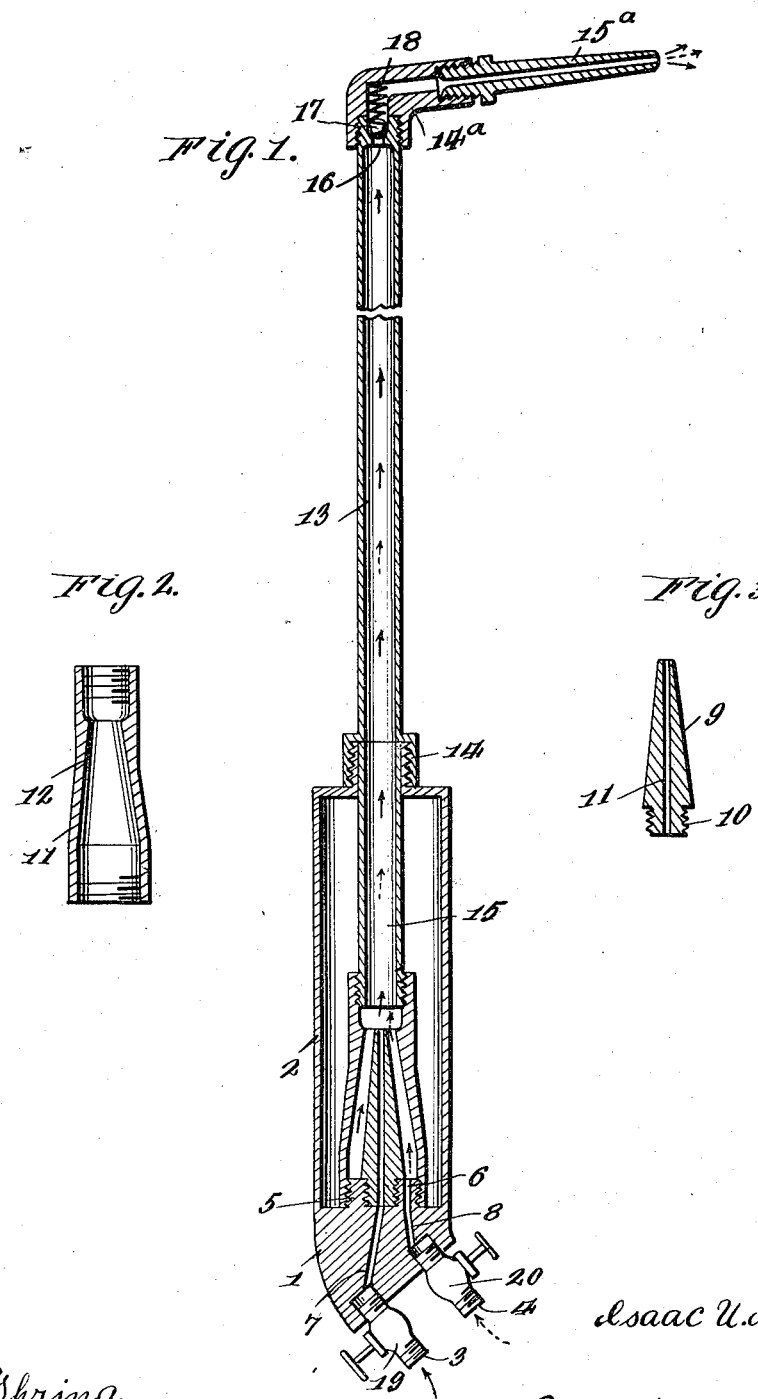

UNITED STATES PATENT OFFICE.

ISAAC U. MARLIN, OF SHREVEPORT, LOUISIANA, ASSIGNOR, BY MESNE ASSIGNMENTS, TO GEORGE T. CUNNINGHAM AND LOUIS T. CUNNINGHAM, BOTH OF SHREVEPORT, LOUISIANA.

WELDING-TORCH.

1,228,038. Specification of Letters Patent. Patented May 29, 1917.

Application filed May 15, 1914. Serial No. 838,828.

*To all whom it may concern:*

Be it known that I, ISAAC U. MARLIN, a citizen of the United States, residing at Shreveport, in the parish of Caddo and State of Louisiana, have invented certain new and useful Improvements in Welding-Torches, of which the following is a specification.

The object of my invention is to provide a welding torch of the oxy-acetylene type so constructed that the gases may be fed to the torch at a comparatively low pressure and the proper mixture will be obtained with the gases in the desired proportion and thoroughly intermingled thus preventing burning of the metal being worked.

A further object is to so construct the torch that there can be no back-fire and the formation of soot and scales within the tip of the torch is prevented.

With other objects in view, which will be referred to, my invention consists in the peculiar combination and novel arrangement of parts, such as will be hereinafter more fully described in connection with the accompanying drawing and more particularly pointed out in the appended claims.

In the drawing:—

Figure 1 is a longitudinal sectional view through the torch to more clearly illustrate the parts and the operation.

Fig. 2 is a sectional view through the combining tube.

Fig. 3 is a smilar view through the oxygen supply-nipple.

In a welding torch of the oxy-acetylene type, if too great a proportion of oxygen is contained in the mixture as discharged from the torch tip to the flame, this excess of oxygen combines with the metal and the metal is said to be burned, in case iron is being worked upon, the oxygen would combine to form the comparatively fragile substance ferric oxid and the life and tenacity of the metal would be destroyed, on the other hand, if an excess of acetylene gas be present, the torch is apt to back-fire and soot and scales are formed in the burner tip.

The torch structure comprises the butt 1 which has the hollow handle 2 extending therefrom and the oxygen inlet 3 and the acetylene inlet 4 are connected with this butt 1. The butt 1 within the handle 2 has a screw-threaded projection 5 provided and this projection 5 is cored out at its center at 6 and is provided with internal screw threads. A passage 7 is provided through the butt 1 from the oxygen supply to the cored-out portion 6 and a similar passage 8 is provided from the acetylene inlet to open on the face of the projection 5 in the marginal portion surrounding the cored-out section of this projection. An oxygen nipple 9 has its lower screw-threaded end 10 received in the cored-out orifice 6, this nipple being tapered from its base to its outer end and provided with a passage 11 which establishes communication from the passage 7 to the outlet of this nipple. A combining tube 11 is secured on the screw threads of the projecting portion 5 to surround the nipple 9 and the side walls of this combining tube are constricted as at 12 to conform very closely to the converging side of the nipple.

A mixing tube 13 is connected by tube union 14 with the handle of the torch and this mixing tube is extended a sufficient distance that the heat from the flame will not be transmitted to the handle 2. A short section of tube 15 is secured in the union 14 and is connected in the outer end of the combining tube 11 in such a manner that the mixing tube is substantially a continuation of the combining tube. At the outer end of the mixing tube 13, the torch head 14ª is secured and this torch head is preferably so constructed that the tip 15ª secured in the free end thereof is at an angle to the extent of the mixing tube. A valve seat 16 is provided and ball-check valve 17 is positioned to fit down within this valve seat and to be held normally closed by a coil spring 18 to prevent back-fire through the torch tip and head to the mixing tube. Cut-off valves 19 and 20 are provided in the oxygen and acetylene supply lines to control and regulate the supply of each of these gases permitted to flow to the torch.

In use, oxygen is permitted to flow through the supply 3 through passage 7 and passage 11 to the outlet of the oxygen nipple and acetylene is permitted to pass from the supply 4 through the valve 20 and through passage 8 into the combining tube around the outside of the oxygen nipple. As the combining tube is constricted near its upper end and the discharge of the oxygen from the oxygen nipple is substantially at the point of greatest restriction, a siphonic action is created within that part of the combining tube which surrounds the nipple and the acetylene gas is drawn from this space and is caused to flow with the oxygen into and through the mixing tube 13 where the two gases are circulated together and are more thoroughly intermingled. In Fig. 1 the course of the oxygen is indicated by the full-line arrow while the course of the acetylene gas is indicated by the dotted-line arrow. When the pressure of the combined gases in the mixing tube 13 becomes sufficiently great the ball check 17 will be raised from the valve seat 16 against the tension of the spring 18 and this combined oxy-acetylene gas will be permitted to pass out through the burner tip 15ª to the flame. Any decrease of the pressure of the gas flowing through the mixing tube will permit the ball check to be again seated and the torch will be prevented from back-firing into the mixing tube.

From the foregoing, it will be seen that I have provided a welding torch in which the two gases oxygen and acetylene used at the flame are thoroughly combined and intermingled before being permitted to pass to the flame and thus burning of the metal being worked is prevented and there is not the tendency to the formation of soot and scales in the burner tip; further, with the torch as shown and described all danger of back-firing is absolutely precluded.

While I have herein shown and described one specific form of my invention, it will be understood that slight changes might be made in the form and arrangement of the parts without departing from the spirit and scope of my invention, and hence I do not wish to be limited thereto except for such limitations as the claims may import.

I claim:—

1. A welding torch comprising a mixing chamber, an oxygen supply to said mixing chamber, a combustible gas-supply connected with said mixing chamber, a burner connected with the mixing chamber, and a check valve between said mixing chamber and said burner to permit a supply of gas to the burner and to prevent back fire from the burner thereinto.

2. A welding torch comprising a hollow cylindrical body having a solid lower end, a projection extending from the solid end and within the hollow body, a combining tube engaged with the projection and extending longitudinally and centrally within the hollow body, a tapering nipple also engaged with the projection and extending within the combining tube, and a mixing tube connected with the combining tube.

3. A welding torch comprising an oxygen supply nipple, a combining tube connected around said nipple, an oxygen supply connected with the nipple, a combustible gas supply connected to supply a combustible gas to the combining tube, a mixing tube connected with the combining tube beyond the extent of the nipple, a burner connected with the mixing tube, and a check valve connected between said mixing tube and said burner to permit the flow of gas from the mixing tube to the burner and to prevent back fire into the mixing tube.

4. A welding torch comprising an oxygen supply-nipple, a combining tube connected around said nipple, an oxygen supply connected with the nipple, a combustible gas supply connected to supply a combustible gas to the combining tube, valves to control the flow of gas through each of said supplies, a mixing tube connected with the combining tube beyond the extent of the nipple, a burner connected with the mixing tube, and a check valve between the mixing tube and said burner to permit the flow of gas from the mixing tube to the burner and to prevent back fire.

5. A welding torch comprising an oxygen supply-nipple, a combining tube connected around said nipple, an oxygen supply connected with the nipple, a combustible gas supply connected to supply a combustible gas to the combining tube, valves to control the flow of gas through each of said supplies, a mixing tube connected with the combining tube beyond the extent of the nipple, a burner connected with the mixing tube, a check valve located between the mixing tube and burner, and a spring acting to normally hold said check valve closed against back fire from the burner and to resiliently permit opening of the valve as the proper gas pressure is attained within the tube.

6. A gaseous fuel burner comprising an outer shell, a mixing chamber arranged in the shell, a burner tube communicating with the mixing chamber, a burner mounted in the outer end of the burner tube, and a check valve arranged in the burner tube.

In testimony whereof I affix my signature in presence of two witnesses.

ISAAC U. MARLIN.

Witnesses:
L. P. CHAPMAN,
J. B. AIKEN.